US009536115B2

(12) United States Patent
Wang

(10) Patent No.: US 9,536,115 B2
(45) Date of Patent: Jan. 3, 2017

(54) ELECTRONIC DEVICE AND METHOD FOR UNLOCKING THE ELECTRONIC DEVICE

(71) Applicants: SHENZHEN FUTAIHONG PRECISION INDUSTRY CO., LTD., Shenzhen (CN); Chiun Mai Communication Systems, Inc., New Taipei (TW)

(72) Inventor: Ke-Xin Wang, Shenzhen (CN)

(73) Assignees: SHENZHEN FUTAIHONG PRECISION INDUSTRY CO., LTD., Shenzhen (CN); Chiun Mai Communication Systems, Inc., New Taipei (TW)

( * ) Notice: Subject to any disclaimer, the term of this patent is extended or adjusted under 35 U.S.C. 154(b) by 65 days.

(21) Appl. No.: 14/692,933

(22) Filed: Apr. 22, 2015

(65) Prior Publication Data

US 2016/0063283 A1 Mar. 3, 2016

(30) Foreign Application Priority Data

Sep. 1, 2014 (CN) .......................... 2014 1 0440169

(51) Int. Cl.
*H04L 29/06* (2006.01)
*G06F 21/82* (2013.01)
*G06F 3/0488* (2013.01)
*G06F 21/31* (2013.01)

(52) U.S. Cl.
CPC .............. *G06F 21/82* (2013.01); *G06F 3/0488* (2013.01); *G06F 21/31* (2013.01)

(58) Field of Classification Search
CPC ........ G06F 21/82; G06F 21/31; G06F 3/0488; H04W 12/08; H04W 12/06
See application file for complete search history.

(56) References Cited

U.S. PATENT DOCUMENTS

| 2012/0007836 A1* | 1/2012 | Wu ........................ G06F 1/1626 345/177 |
| 2013/0094770 A1* | 4/2013 | Lee ........................... G06F 21/36 382/218 |
| 2013/0318475 A1* | 11/2013 | Xie ........................ G06F 3/0482 715/823 |
| 2014/0145990 A1* | 5/2014 | Ho ....................... G06F 3/04883 345/173 |

(Continued)

*Primary Examiner* — Shawnchoy Rahman
(74) *Attorney, Agent, or Firm* — Zhigang Ma

(57) ABSTRACT

In a method for unlocking an electronic device with a touch screen and a distance sensor, a triggering signal to unlock the electronic device is received. Objects within a predetermined distance of the distance sensor is determined. The touch screen is activated to display an unlocking area if no object is detected within the predetermined distance of the distance sensor. Touch signals are received from the unlocking area to determine whether an unlocking operation is performed. A time duration that the touch screen has been activated is calculated to determine whether the unlocking operation is performed within a preset time period from activation of the touch screen. The electronic device is unlocked if the unlocking operation is performed within a preset time period from activation of the touch screen, and a predetermined application is executed when the electronic device is unlocked.

17 Claims, 5 Drawing Sheets

(56) References Cited

U.S. PATENT DOCUMENTS

| | | | |
|---|---|---|---|
| 2015/0042575 A1* | 2/2015 | Dong | G06F 21/82 345/173 |
| 2015/0229757 A1* | 8/2015 | Chai | G06F 3/04883 455/411 |

* cited by examiner

ELECTRONIC DEVICE AND METHOD FOR UNLOCKING THE ELECTRONIC DEVICE

CROSS-REFERENCE TO RELATED APPLICATIONS

This application claims priority to Chinese Patent Application No. 201410440169.9 filed on Sep. 1, 2014, the contents of which are incorporated by reference herein.

FIELD

The subject matter herein generally relates to touch-sensitive displays, and more particularly to unlocking of a touch screen on an electronic device.

BACKGROUND

An electronic device, such as a mobile phone or a personal digital assistant (PDA), is popular and can use a touch screen as a display and a user input device. The touch screen usually remains sleeping and locked unless woken (e.g., a physical button of the electronic device is pressed and the touch screen is activated). However, after being woken, the touch screen usually only displays a main menu of the electronic device. Calls and messages that the electronic device has received when the touch screen is sleeping and locked cannot be displayed immediately when the touch screen is unlocked because the main menu is displayed first.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
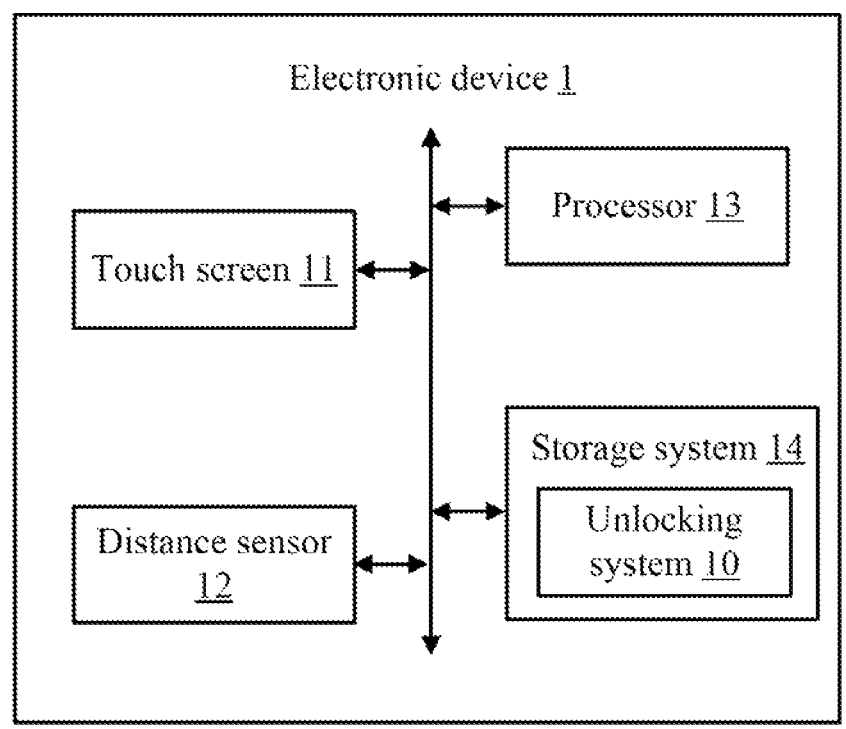
FIG. 1 is a block diagram of an example embodiment of an electronic device including an unlocking system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation. It should be noted that references to "an" or "one" embodiment in this disclosure are not necessarily to the same embodiment, and such references mean "at least one."

Furthermore, the term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives.

FIG. 1 is a block diagram of an example embodiment of an electronic device including an unlocking system. In at least one embodiment, an electronic device 1 includes an unlocking system 10. The electronic device 1 can be a smart phone, a tablet computer, or a personal digital assistant (PDA), for example, which employs a touch screen 11. The electronic device 1 further includes, but is not limited to, a distance sensor 12, at least one processor 13 and a storage system 14. FIG. 1 illustrates only one example of the electronic device that can include more or fewer components than illustrated, or have a different configuration of the various components in other embodiments.

The touch screen 11 can recognize a touch location of a touch operation on the touch screen 11 when the touch screen 11 is touched by a finger or a stylus. The distance sensor 12 can be an optical displacement sensor, a linear proximity sensor, or a ultrasonic displacement sensor. The distance sensor 12 is equipped in a frontal panel 15 of the electronic device 1 or is located in the front of the electronic device 1 (see FIG. 4-5). The distance sensor 12 can emit a signal (e.g., an optical signal or an infrared signal) and calculate a distance between the distance sensor 12 and an object after receiving the signal returning from the object. The at least one processor 13 can be a central processing unit (CPU), a microprocessor, or other data processor chip that performs functions of the electronic device 1. The storage system 14 can include various types of non-transitory computer-readable storage media. For example, the storage system 14 can be an internal storage system, such as a flash memory, a random access memory (RAM) for temporary storage of information, and/or a read-only memory (ROM) for permanent storage of information. The storage system 14 can also be an external storage system, such as a hard disk, a storage card, or a data storage medium.

In at least one embodiment, the unlocking system 10 can display an unlocking area on the touch screen 11 of the electronic device 1 when the touch screen 11 is activated from a sleep mode, and detect whether an unlocking operation is performed according to touch signals received from the unlocking area. If the unlocking operation has not been performed in the unlocking area within a preset time period, the unlocking system 10 can unlock the electronic device 1 automatically, and execute a predetermined application when the electronic device 1 is unlocked.

Figure 2:
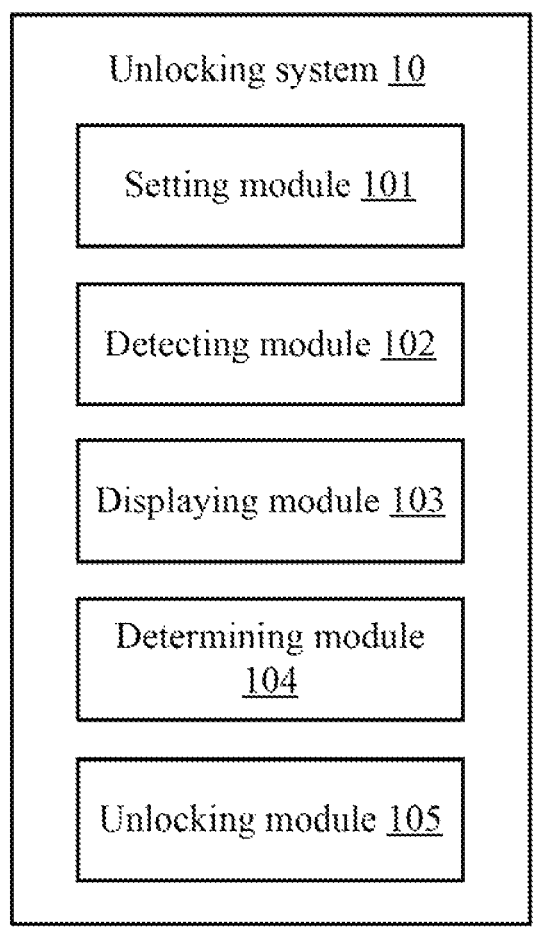
FIG. 2 is a block diagram of an example embodiment of function modules of the unlocking system in FIG. 1.

FIG. 2 is a block diagram of an example embodiment of function modules of the unlocking system in FIG. 1. In at least one embodiment, the locking system 10 can include a setting module 101, a detecting module 102, a display module 103, a determining module 104, and an unlocking module 105. The function modules 101-105 can include computerized code in the form of one or more programs, which are stored in the storage system 14 and can be executed by the at least one processor 13 to provide functions of the function modules 101-105.

The setting module 101 sets a preset time period for unlocking the electronic device 1 and a predetermined application of the electronic device 1. In at least one embodiment, the preset time period can be set as 10 seconds or 30 seconds after the touch screen 11 is activated. The predetermined application can be a phone call application of the electronic device 1 or a message application of the electronic device 1.

The detecting module 102 determines whether the electronic device 1 needs to be unlocked. In at least one embodiment, after being locked, the touch screen 11 of the electronic device 1 may enter into a sleep mode and cannot detect the touch operation performed on the touch screen 11, unless receiving a triggering signal to unlock the electronic device 1 (e.g., a physical button of the electronic device 1 is pressed). When the touch screen 11 receives a triggering signal to unlock the electronic device 1, the detecting module 102 determines whether an object is within a predetermined distance of the distance sensor 12 of the electronic device 1. If an object is within a predetermined distance of the distance sensor 12, the detecting module 102 determines that an incorrect operation is performed on the touch screen 11 (such as some kinds of "pocket dial") and the electronic device 1 does not unlock. If no object is within a predetermined distance of the distance sensor 12, the detecting module 102 determines that the electronic device 1 is out and usable, and needs to be unlocked.

Figure 4:
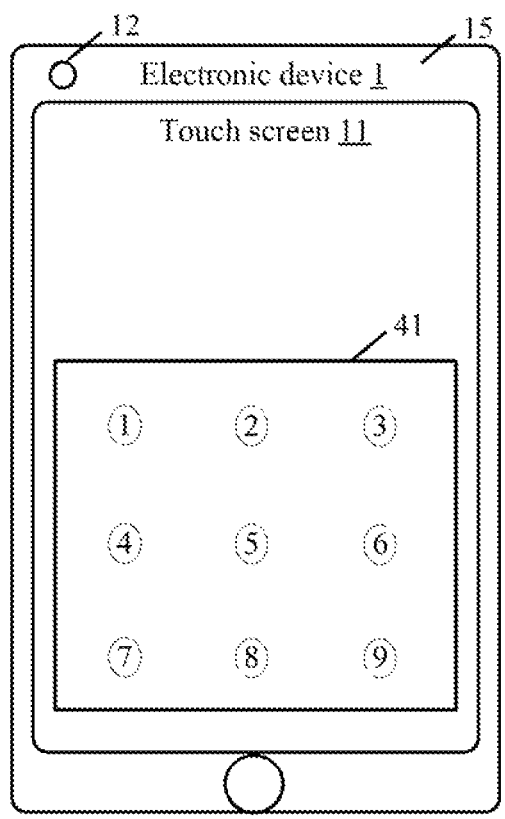
FIG. 4 and FIG. 5 illustrate diagrammatic views of example embodiments of a unlocking area and a distance sensor.
Figure 5:
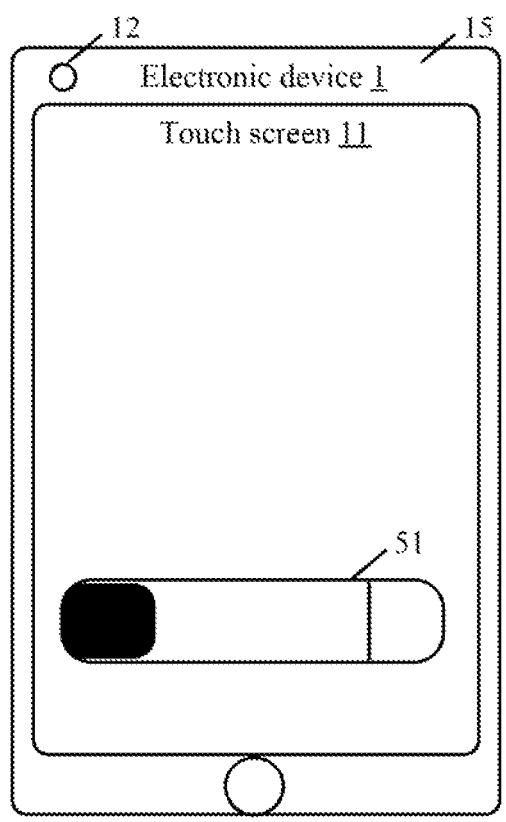

When the electronic device 1 needs to be unlocked, the display module 103 activates the touch screen 11 to display an unlocking area on a portion of the touch screen 11. In at least one embodiment, the unlocking area can be displayed on a specific position or a random position of the touch screen 11. Different unlocking interfaces of different unlocking ways of the electronic device 1 can be displayed in the unlocking area. For example, a number password unlocking interface 41 as shown in FIG. 4 or a sliding unlocking interface 51 as shown in FIG. 5 can be displayed in the unlocking area.

The determining module 104 calculates a time duration that the touch screen 11 has been activated, and determines whether a unlocking operation is performed within the preset time period from activation of the touch screen 11, according to touch signals received from the unlocking interface displayed in the unlocking area. In at least one embodiment, the unlocking operation can be a password inputting operation or a predetermined sliding operation.

The unlocking module 105 unlocks the electronic device 1, and displays a main menu of the electronic device 1 on the touch screen 11 when the unlocking operation has been performed within the preset time period from activation of the touch screen 11. When the unlocking operation has not been performed within the preset time period from activation of the touch screen 11, the unlocking module 105 unlocks the electronic device 1, and executes the predetermined application of the electronic device 1 when the electronic device 1 is unlocked. In at least one embodiment, the predetermined application includes a phone call application or a message application.

Figure 3:
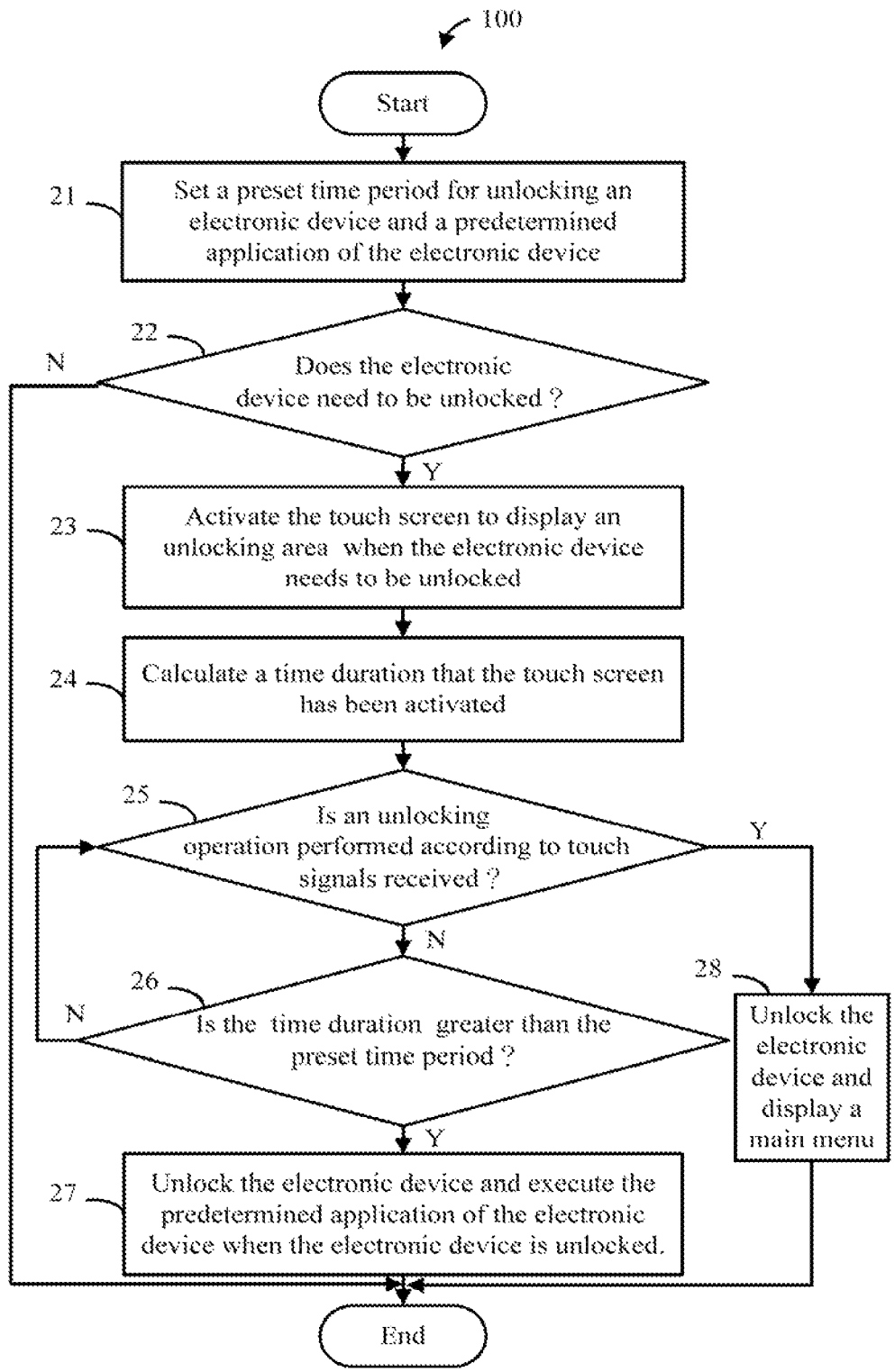
FIG. 3 is a flowchart of an example embodiment of a method for unlocking the electronic device in FIG. 1.

FIG. 3 is a flowchart of an example embodiment of a method 100 for unlocking the electronic device in FIG. 1. In at least one embodiment, the method 100 is provided by way of example, as there are a variety of ways to carry out the method. The method 100 described below can be carried out using the configurations illustrated in FIG. 1-2, for example, and various elements of these figures are referenced in explaining example method. Each block shown in FIG. 3 represents one or more processes, methods, or subroutines, carried out in the exemplary method. Furthermore, the illustrated order of blocks is by example only and the order of the blocks can be changed. The exemplary method can begin at block 21. Depending on the embodiment, additional blocks can be added, others removed, and the ordering of the blocks can be changed.

At block 21, a setting module sets a preset time period for unlocking an electronic device and a predetermined application of the electronic device.

At block 22, a detecting module determines whether the electronic device needs to be unlocked.

At block 23, when the electronic device needs to be unlocked, a display module activates the touch screen to display an unlocking area on a portion of the touch screen. The unlocking area can be a specific position or a random position displayed on the touch screen.

At block 24, a determining module calculates a time duration that the touch screen has been activated.

At block 25, the determining module determines whether a unlocking operation is performed according to touch signals received from the unlocking interface displayed in the unlocking area on the touch screen. The unlocking operation can be a password inputting operation or a predetermined sliding operation. If the unlocking operation is performed, the process goes to block 28. Otherwise, if the unlocking operation is not performed, the process goes to block 26.

At block 26, the determining module determines whether the time duration that the touch screen has been activated is greater than the preset time period from activation of the touch screen 11. If the time duration that the touch screen has been activated is greater than the preset time period from activation of the touch screen 11, the process goes to block 27. Otherwise, If the time duration that the touch screen has been activated is not greater than the preset time period from activation of the touch screen 11, the process goes back to block 25.

At block 27, a unlocking module unlocks the electronic device and executes the predetermined application of the electronic device when the electronic device is unlocked. The predetermined application includes a phone call application or a message application.

At block 28, the unlocking module unlocks the electronic device and displays a main menu of the electronic device on the touch screen.

It should be emphasized that the above-described embodiments of the present disclosure, including any particular embodiments, are merely possible examples of implementations, set forth for a clear understanding of the principles of the disclosure. Many variations and modifications can be made to the above-described embodiment(s) of the disclosure without departing substantially from the spirit and principles of the disclosure. All such modifications and variations are intended to be included herein within the scope of this disclosure and protected by the following claims.

What is claimed is:

1. A computer-implemented method for unlocking an electronic device with a touch screen and a distance sensor, the method being performed by at least one processor of the electronic device and comprising:

receiving a triggering signal to unlock the electronic device;

determining whether an object is within a predetermined distance of the distance sensor;

if no object is detected within the predetermined distance of the distance sensor, activating the touch screen to display an unlocking area on a portion of the touch screen;

determining whether an unlocking operation is performed according to touch signals received from the unlocking area of the touch screen;

determining whether the unlocking operation is performed in the unlocking area of the touch screen within a preset time period from activation of the touch screen;

unlocking the electronic device if the unlocking operation has not been performed within the preset time period from activation of the touch screen; and executing a predetermined application when the electronic device is unlocked.

2. The method according to claim 1, the method further comprising:

unlocking the electronic device if the unlocking operation is performed in the unlocking area of the touch screen within the preset time period; and displaying a main menu of the electronic device when the electronic device is unlocked.

3. The method according to claim 1, wherein the distance sensor is equipped in a frontal panel of the electronic device or located in the front of the electronic device.

4. The method according to claim 1, wherein the unlocking area is a specific position or a random position displayed on the touch screen.

5. The method according to claim 1, wherein the predetermined application is a message application or a phone call application.

6. An electronic device, comprising:
a distance sensor;
a touch screen;
at least one processor; and
a storage system that stores one or more programs, when executed by the at least one processor, cause the at least one processor to:
receive a triggering signal to unlock the electronic device;
determine whether an object is within a predetermined distance of the distance sensor;
if no object is detected within the predetermined distance of the distance sensor, activate the touch screen to display an unlocking area on a portion of the touch screen;
determine whether an unlocking operation is performed according to touch signals received from the unlocking area of the touch screen;
determine whether the unlocking operation is performed in the unlocking area of the touch screen within a preset time period from activation of the touch screen;
unlock the electronic device if the unlocking operation has not been performed within the preset time period from activation of the touch screen; and
execute a predetermined application when the electronic device is unlocked.

7. The electronic device according to claim 6, wherein the electronic device is unlocked if the unlocking operation is performed within the preset time period from activation of the touch screen.

8. The electronic device according to claim 7, wherein a main menu of the electronic device is displayed on the touch screen when the electronic device is unlocked.

9. The electronic device according to claim 6, wherein the distance sensor is equipped in a frontal panel of the electronic device or located in the front of the electronic device.

10. The electronic device according to claim 6, wherein the unlocking area is a specific position or a random position displayed on the touch screen.

11. The method according to claim 6, wherein the predetermined application is a message application or a phone call application.

12. A non-transitory storage medium having stored thereon instructions that, when executed by a processor of an electronic device with a touch screen and a distance sensor, causes the processor to perform a method for unlocking the electronic device, the method comprising:

receiving a triggering signal to unlock the electronic device;

determining whether an object is within a predetermined distance of the distance sensor;

if no object is detected within the predetermined distance of the distance sensor, activating the touch screen to display an unlocking area on a portion of the touch screen;

determining whether an unlocking operation is performed according to touch signals received from the unlocking area of the touch screen;

determining whether the unlocking operation is performed in the unlocking area of the touch screen within a preset time period from activation of the touch screen;

unlocking the electronic device if the unlocking operation has not been performed within the preset time period from activation of the touch screen; and executing a predetermined application when the electronic device is unlocked.

13. The non-transitory storage medium according to claim 12, wherein the electronic device is unlocked if the unlocking operation is performed within the preset time period from activation of the touch screen.

14. The non-transitory storage medium according to claim 13, wherein a main menu of the electronic device is displayed on the touch screen when the electronic device is unlocked.

15. The non-transitory storage medium according to claim 12, wherein the distance sensor is equipped in a frontal panel of electronic device or located in the front of the electronic device.

16. The non-transitory storage medium according to claim 12, wherein the unlocking area is a specific position or a random position displayed on the touch screen.

17. The non-transitory storage medium according to claim 12, wherein the predetermined application is a message application or a phone call application.

* * * * *